(12) United States Patent
Nomura (10) Patent No.: US 8,787,981 B2
(45) Date of Patent: Jul. 22, 2014

(54) ELECTRONIC DEVICE, DISPLAY METHOD AND PROGRAM

(75) Inventor: Masato Nomura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/409,578

(22) Filed: Mar. 1, 2012

(65) Prior Publication Data

US 2012/0225695 A1 Sep. 6, 2012

(30) Foreign Application Priority Data

Mar. 3, 2011 (JP) ................................ 2011-046535

(51) Int. Cl.
*H04B 1/38* (2006.01)

(52) U.S. Cl.
USPC ........ 455/566; 455/556.1; 715/234; 715/810; 715/863

(58) Field of Classification Search
USPC ................ 715/863, 810, 234; 455/566, 556.1
See application file for complete search history.

(56) References Cited

U.S. PATENT DOCUMENTS

| | | | |
|---|---|---|---|
| 8,201,109 B2* | 6/2012 | Van Os et al. ................. | 715/863 |
| 8,255,830 B2* | 8/2012 | Ording et al. ................. | 715/810 |
| 8,370,736 B2* | 2/2013 | Ording et al. ................. | 715/234 |
| 2009/0228842 A1* | 9/2009 | Westerman et al. .......... | 715/863 |

FOREIGN PATENT DOCUMENTS

JP 2010-134679 A 6/2010

OTHER PUBLICATIONS

UniqueApps (http://www.youtube.com/watch?v=k49kMIhMP1U, Mar. 19, 2009).*

\* cited by examiner

*Primary Examiner* — Junpeng Chen
(74) *Attorney, Agent, or Firm* — Hoffmann & Baron, LLP (57) ABSTRACT

An electronic device includes an operation unit, a storage unit and a control unit. The operation unit selects a selected image. The storage unit stores selected data and peripheral data. The selected data corresponds to the selected image selected by the operation unit. The peripheral data corresponds to images around the selected image. In a case in which a second application is activated, the control unit reads the selected data from the storage unit so as to be developed in the second application, and displays the selected image. In a case in which a predetermined operation is performed for the selected image by the operation unit, the control unit reads the peripheral data from the storage unit, adds an image, which is based on corresponding data that corresponds to at least a part of the peripheral data, to the selected image, and displays a resultant image.

10 Claims, 5 Drawing Sheets

ELECTRONIC DEVICE, DISPLAY METHOD AND PROGRAM

This application is based on and claims the benefit of priority from Japanese Patent Application No. 2011-046535, filed on 3 Mar. 2011, the content of which is incorporated herein by reference.

BACKGROUND OF THE INVENTION

1. Field of the Invention

The present invention relates to an electronic device including a display unit that can display an image and an operation unit that can select an image displayed on the display unit, and also relates to a display method in the electronic device as well as a program executed in the electronic device.

2. Related Art

Some electronic devices such as cellular telephone devices include a display unit that can display an image, and an operation unit that can select an image displayed on the display unit. Some of such electronic devices select a predetermined character string from among text images displayed on the display unit, based on an operation of the operation unit. Here, in a case in which a character string is selected from among text images displayed on the display unit, there is a possibility of selecting a character string that is not intended by a user. Accordingly, some cellular telephone devices extract character strings around the selected character string, and display the extracted character strings as correction candidate character strings for correcting the selected character string on the display unit (see Art 1: Japanese Unexamined Patent Application, Publication No. 2010-134679).

SUMMARY OF THE INVENTION

However, in Art 1, it is only in a single application that a character string displayed on the display unit can be replaced with the correction candidate character string, in a case in which a character string is selected from text images, correction candidate character strings are displayed on the display unit, and a correction candidate character string is selected. Therefore, in Art 1, in a case in which a character string is selected from text images displayed on the display unit in a single application, and the selection of the character string is established, if the character string is developed in another application, the character string developed in another application cannot be replaced with a correction candidate character string.

An object of the present invention is to provide an electronic device that can add another image to a selected image, even in a case in which the image selected in an application is developed in another application.

Another object of the present invention is to provide a display method in the electronic device as well as a program executed in the electronic device.

The electronic device according to an embodiment of the present invention includes a display unit, an operation unit, a storage unit and a control unit. The display unit displays an image that is based on data. The operation unit can select at least a part of the image displayed on the display unit as a selected image. The storage unit stores selected data and peripheral data. In a case in which an image that is based on data is displayed on the display unit as a result of processing by a first application, the selected data corresponds to a selected image selected by the operation unit. The peripheral data corresponds to images around the selected image. In a case in which a second application different from the first application is activated after the selected data and the peripheral data are stored in the storage unit, the control unit reads the selected data stored in the storage unit so as to be developed in the second application, and displays a selected image, which is based on the selected data, on the display unit. Furthermore, in a case in which a predetermined operation is performed for the selected image by the operation unit, the control unit reads the peripheral data stored in the storage unit, adds an image, which is based on corresponding data that corresponds to at least a part of the peripheral data, to the selected image, and displays a resultant image on the display unit.

In a case in which the control unit adds an image, which is based on the corresponding data, to the selected image, and displays a resultant image on the display unit, it is preferable for the control unit to delete the peripheral data from the storage unit.

In a case in which the second application is terminated, it is preferable for the control unit to delete the peripheral data from the storage unit.

It is preferable for the control unit to specify the corresponding data of different quantities from among the peripheral data in accordance with an operated variable of the predetermined operation for the selected image by the operation unit. Furthermore, it is preferable for the control unit to add an image, which is based on the corresponding data thus specified, to the selected image, and display a resultant image on the display unit.

In a case in which the control unit reads the selected data stored in the storage unit so as to be developed in the second application, it is preferable for the control unit to display a selected image, which is based on the selected data, on the display unit. Furthermore, it is preferable for the control unit to display an image that is based on peripheral data stored in the storage unit, in an area different from the area of displaying the selected image.

In a case in which an operation for an area on a left side of the selected image displayed on the display unit is performed as the predetermined operation for the selected image by the operation unit, it is preferable for the control unit to set, from among the peripheral data stored in the storage unit, data that is positioned on the left side of the selected image as the corresponding data, add an image, which is based on the corresponding data, on the left side of the selected image, and display a resultant image on the display unit.

In a case in which an operation for an area on a left side of the selected image displayed on the display unit is performed as the predetermined operation for the selected image by the operation unit, when the operation for the area on the left side of the selected image is an operation moving toward a left direction from the selected image, it is preferable for the control unit to set, from among the peripheral data stored in the storage unit, data that is positioned on the left side of the selected image as the corresponding data, add an image, which is based on the corresponding data, on the left side of the selected image, and display a resultant image on the display unit. On the other hand, in the above case, when the operation for the area on the left side of the selected image is an operation moving toward a right direction from the selected image, it is preferable for the control unit to delete, from the display unit, an image corresponding to the area on the left side of the selected image displayed on the display unit.

In a case in which an operation for an area on a right side of the selected image displayed on the display unit is performed as the predetermined operation for the selected image by the operation unit, it is preferable for the control unit to set, from among the peripheral data stored in the storage unit, data that is positioned on the right side of the selected image as the corresponding data, add an image, which is based on the corresponding data, on the right side of the selected image, and display a resultant image on the display unit.

In a case in which an operation for an area on a right side of the selected image displayed on the display unit is performed as the predetermined operation for the selected image by the operation unit, when the operation for the area on the right side of the selected image is an operation moving toward a right direction from the selected image, it is preferable for the control unit to set, from among the peripheral data stored in the storage unit, data that is positioned on the right side of the selected image as the corresponding data, add an image, which is based on the corresponding data, on the right side of the selected image, and display a resultant image on the display unit. On the other hand, in the above case, when the operation for the area on the right side of the selected image is an operation moving toward a left direction from the selected image, it is preferable for the control unit to delete, from the display unit, an image corresponding to the area on the right side of the selected image displayed on the display unit.

A display method according to an embodiment of the present invention is a display method for an electronic device that includes a display unit, an operation unit and a storage unit. In other words, the display method includes a first step, a second step, a third step and a fourth step. In the first step, at least a part of an image, which is based on data displayed on the display unit as a result of processing by a first application, is selected as a selected image by the operation unit. In the second step, selected data corresponding to the selected image selected by the operation unit, and peripheral data corresponding to images around the selected image are stored in the storage unit. In the third step, the selected data stored in the storage unit is read and developed in a second application different from the first application, and a selected image, which is based on the selected data, is displayed on the display unit. In the fourth step, in a case in which a predetermined operation is performed for the selected image by the operation unit, the peripheral data is read from the storage unit, an image, which is based on corresponding data that corresponds to at least a part of the peripheral data, is added to the selected image, and a resultant image is displayed on the display unit.

A program according to an embodiment of the present invention is a program executed by an electronic device that includes a display unit, an operation unit and a storage unit. In other words, the program executes a first step, a second step, a third step and a fourth step. In the first step, at least a part of an image, which is based on data displayed on the display unit as a result of processing by a first application, is selected as a selected image by the operation unit. In the second step, selected data corresponding to the selected image selected by the operation unit, and peripheral data corresponding to images around the selected image are stored in the storage unit. In the third step, the selected data stored in the storage unit is read and developed in a second application different from the first application, and a selected image, which is based on the selected data, is displayed on the display unit. In the fourth step, in a case in which a predetermined operation is performed for the selected image by the operation unit, the peripheral data is read from the storage unit, an image, which is based on corresponding data that corresponds to at least a part of the peripheral data, is added to the selected image, and a resultant image is displayed on the display unit.

According to the embodiment of the present invention, even in a case in which an image selected in an application is developed in another application, another image can be added to the selected image.

DETAILED DESCRIPTION OF THE INVENTION

Figure 1:
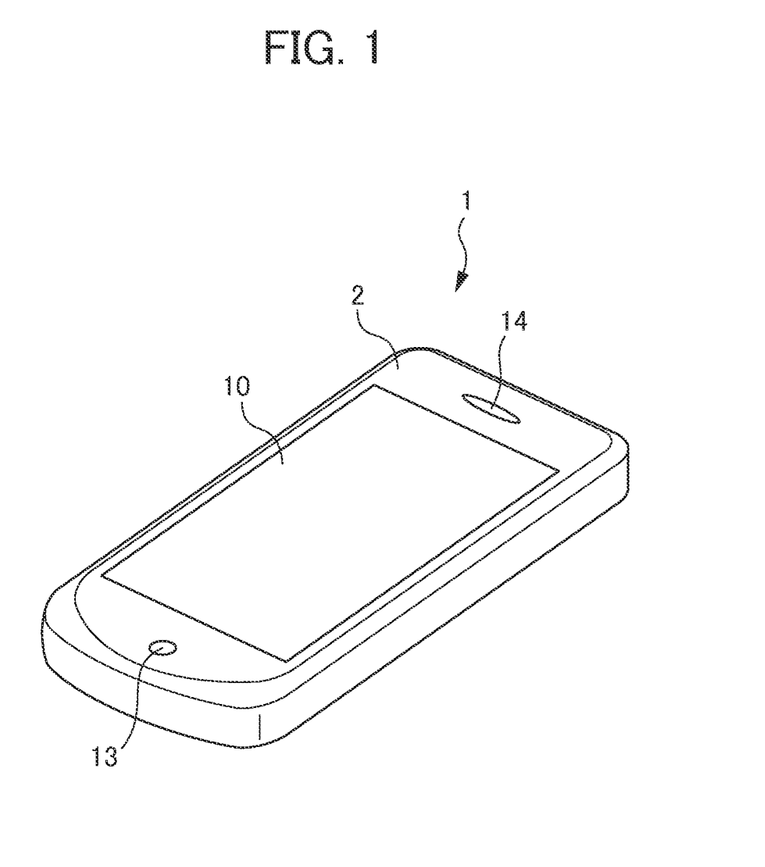
FIG. 1 is a perspective view showing an appearance of a cellular telephone device according to an embodiment of the present invention.

Descriptions are provided hereinafter regarding an embodiment of the present invention. First of all, with reference to FIG. 1, descriptions are provided for a configuration of a cellular telephone device 1 according to an embodiment of the electronic device of the present invention. FIG. 1 is a perspective view showing an appearance of a cellular telephone device 1.

The cellular telephone device 1 includes a body 2. A touch panel 10, a microphone 13 and a receiver 14 are disposed on a front face portion of the body 2.

Figure 2:
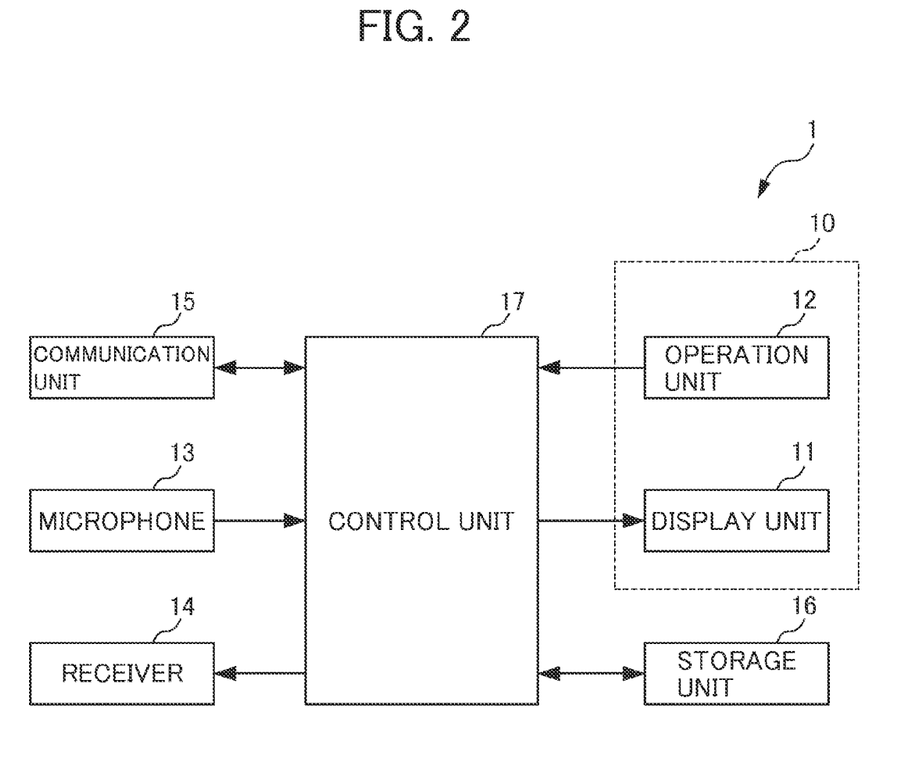
FIG. 2 is a block diagram showing a functional configuration of the cellular telephone device.

The touch panel 10 includes a display unit 11 and an operation unit 12 (see FIG. 2). The display unit 11 is a display panel composed of liquid crystals or organic electroluminescence elements. In the present embodiment, the operation unit 12 functions as a detecting unit. In other words, the operation unit 12 detects a touch by an object, such as a finger or stylus of a user of the cellular telephone device 1, on the display unit 11. The operation unit 12 is correspondingly disposed on a surface of the display unit 11. For example, a capacitive sensing method, a resistive film method or the like can be utilized in the operation unit 12.

The microphone 13 is used for inputting sound produced by the user of the cellular telephone device 1 during a telephone call.

The receiver 14 is used for outputting sound produced by the other party to the user of the cellular telephone device 1 during a phone call.

Next, a functional configuration of the cellular telephone device 1 is described with reference to FIG. 2. FIG. 2 is a block diagram showing the functional configuration of the cellular telephone device 1.

The cellular telephone device 1 includes the touch panel (the display unit 11 and the operation unit 12), the microphone 13 and the receiver 14, as described above. Furthermore, the cellular telephone device 1 includes a communication unit 15, a storage unit 16 and a control unit 17.

The communication unit 15 performs communication with an external device via a predetermined usable frequency band. More specifically, the communication unit 15 executes demodulation processing of a signal received via an antenna. In addition, the communication unit 15 transmits the signal thus processed to the control unit 17. The communication unit 15 executes modulation processing of a signal transmitted from the control unit 17. Furthermore, the communication unit 15 transmits the signal thus processed to an external device via the antenna. Such an external device includes a base station.

The storage unit 16 is utilized for arithmetic processing by the control unit 17. The storage unit 16 includes, for example, working memory. The storage unit 16 stores a single or plurality of applications or databases that are operated inside the cellular telephone device 1. It should be noted that the storage unit 16 may also serve as detachable external memory.

The control unit 17 controls the entirety of the cellular telephone device 1. The control unit 17 performs control of the display unit 11 and the communication unit 15.

Even in a case in which an image selected in an application is developed in another application, the cellular telephone device 1 with such a configuration has a function of adding another image to the selected image.

Descriptions are hereinafter provided for a configuration and operations for achieving the aforementioned function according to the cellular telephone device 1.

The display unit 11 displays an image that is based on data. The image is, for example, an image that is based on text data such as a character, a character string, a numerical character, a numerical character string, a symbol and a symbol string, as well as text combining those.

The operation unit 12 can select at least a part of an image displayed on the display unit 11 as a selected image. For example, in a case in which text is displayed on the display unit 11 as a result of processing by a first application, when a touch by a finger or the like of the user is detected on the touch panel 10, the operation unit 12 selects a character string and the like displayed in an area that corresponds to a portion thus touched. As a specific example, in a case in which "retrieved telephone number is currently . . ." is displayed as text on the display unit 11, when a finger or the like of the user touches an area that corresponds to "telephone", the operation unit 12 selects "telephone".

The storage unit 16 stores selected data and peripheral data. In a case in which an image that is based on data is displayed on the display unit 11 as a result of processing by the first application, the selected data corresponds to a selected image selected by the operation unit 12. The peripheral data corresponds to images around the selected image. A specific example is described in a state where "retrieved telephone number is currently . . ." is displayed as text on the display unit 11. In a case in which "telephone" is selected by the operation unit 12 in this state, the storage unit 16 stores selected data that corresponds to the selected image "telephone". The storage unit 16 stores peripheral data that corresponds to images included in "retrieved telephone number is currently" around the selected image "telephone". Here, the peripheral images include the selected image as in the specific example described above.

Moreover, the storage unit 16 can store peripheral data that corresponds to images (peripheral images) of a predetermined number of characters among a plurality of characters adjacent to the selected image. The predetermined number for such characters is set in advance. Alternatively, the predetermined number for such characters is appropriately set by the user of the cellular telephone device 1. In the specific example described above, five characters are set as a predetermined number of characters.

In a case in which a second application different from the first application is activated after the selected data and the peripheral data are stored in the storage unit 16, the control unit 17 performs control as follows. First of all, the control unit 17 reads the selected data stored in the storage unit 16 so as to be developed in the second application. Subsequently, the control unit 17 displays the selected image, which is based on the selected data, on the display unit 11.

In a case in which a predetermined operation is performed for the selected image by the operation unit 12, the control unit 17 performs control as follows. First of all, the control unit 17 reads the peripheral data stored in the storage unit 16. The peripheral data thus read includes corresponding data that corresponds to at least a part of the peripheral data. Subsequently, the control unit 17 adds an image, which is based on the corresponding data, to the selected image, and displays a resultant image on the display unit 11. The predetermined operation is, for example, an operation to touch a left side of the selected image displayed on the display unit 11, or an operation to touch a right side of the selected image displayed on the display unit 11. The predetermined operation may simply be a sliding operation on the left side of the selected image displayed on the display unit 11, or a sliding operation on the right side of the selected image displayed on the display unit 11. The predetermined operation will be described later in detail.

In a case in which the selected image is displayed on the display unit 11 based on processing by the second application, and an operation is performed as a predetermined operation for an area on the left side of the selected image, the control unit 17 displays, from among the peripheral images, an image adjacent to the left side of the selected image on the display unit 11. A specific example is described. This specific example employs a state where the selected image "telephone" is displayed on the display unit 11, and the peripheral data corresponding to a peripheral image "retrieved telephone number is currently" is stored in the storage unit 16. In a case in which the left side of selected image displayed on the display unit 11 is touched in this state, the control unit 17 specifies, from among the peripheral data, corresponding data that corresponds to an image "retrieved" adjacent to the left side of the selected image "telephone". Furthermore, the control unit 17 displays the image "retrieved", which is based on the corresponding data, on the left side of the selected image "telephone" that is displayed on the display unit 11. As a result, an image "retrieved telephone" is displayed on the display unit 11.

On the other hand, in a case in which the selected image is displayed on the display unit 11 based on processing by the second application, and an operation is performed as a predetermined operation for an area on the right side of the selected image, the control unit 17 displays, from among the peripheral images, an image adjacent to the right side of the selected image on the display unit 11. A specific example is described. This specific example employs a state where the selected image "telephone" is displayed on the display unit 11, and the peripheral data corresponding to the peripheral image "retrieved telephone number is currently" is stored in the storage unit 16. In a case in which the right side of selected image displayed on the display unit 11 is touched in this state, the control unit 17 specifies, from among the peripheral data, corresponding data that corresponds to an image "number is currently" adjacent to the right side of the selected image "telephone". Furthermore, the control unit 17 displays the image "number is currently", which is based on the corresponding data, on the right side of the selected image "telephone" that is displayed on the display unit 11. As a result, an image "telephone number is currently" is displayed on the display unit 11.

As a result, even in a case in which an image (a selected image) selected in the first application is developed in the second application, the cellular telephone device 1 can replace the selected image with another image.

In a case in which the control unit 17 adds an image, which is based on the corresponding data, to the selected image, and displays a resultant image on the display unit 11, it is preferable for the control unit 17 to delete the peripheral data from the storage unit 16.

In a case in which the second application is terminated, it is preferable for the control unit 17 to delete the peripheral data from the storage unit 16. In other words, in a case in which the control unit 17 adds an image, which is based on the corresponding data, to the selected image, and displays a resultant image on the display unit 11, and thereafter the second application is terminated, the control unit 17 deletes the peripheral data from the storage unit 16. Furthermore, in a case in which the second application is terminated without adding an image, which is based on the corresponding data, to the selected image, the control unit 17 deletes the peripheral data from the storage unit 16.

As a result, the cellular telephone device 1 can secure the memory capacity of the storage unit 16.

It is preferable for the control unit 17 to specify corresponding data of different quantities in accordance with operated variables of a predetermined operation for the selected image by the operation unit 12. It is preferable for the control unit 17 to add an image, which is based on the specified corresponding data, to the selected image, and display a resultant image on the display unit 11. The operated variable is, for example, an amount of contact movement by a finger or the like of the user, a period of time of contact by a finger or the like of the user, or a number of times of contact by a finger or the like of the user.

In a case in which the operated variable is an amount of contact movement of a finger, a quantity of images that are based on corresponding data varies, depending on the amount of movement. In other words, in a case in which the amount of movement of the finger is large, the control unit 17 adds a large number of characters, from among images (character strings) corresponding to the peripheral data, to the selected image, and displays a resultant image on the display unit 11. On the other hand, in a case in which the amount of movement of the finger is small, the control unit 17 adds a small number of characters, from among images (character strings) corresponding to the peripheral data, to the selected image, and displays a resultant image on the display unit 11.

In a case in which the operated variable is a period of time of contact by a finger, a quantity of images that are based on corresponding data varies, depending on the period of time. In other words, in a case in which the period of time of contact by the finger is long, the control unit 17 adds a large number of characters, from among images (character strings) corresponding to the peripheral data, to the selected image, and displays a resultant image on the display unit 11. On the other hand, in a case in which the period of time of contact by the finger is short, the control unit 17 adds a small number of characters, from among images (character strings) corresponding to the peripheral data, to the selected image, and displays a resultant image on the display unit 11.

In a case in which the operated variable is a number of times of contact by a finger, a quantity of images that are based on corresponding data varies, depending on the number of times. In other words, in a case in which the number of times of contact by the finger is large, the control unit 17 adds a large number of characters, from among images (character strings) corresponding to the peripheral data, to the selected image, and displays a resultant image on the display unit 11. On the other hand, in a case in which the number of times of contact by the finger is small, the control unit 17 adds a small number of characters, from among images (character strings) corresponding to the peripheral data, to the selected image, and displays a resultant image on the display unit 11.

As a result, the cellular telephone device 1 can adjust the quantity of images to be added to a selected image, depending on an operated variable of a predetermined operation.

In a case in which the control unit 17 reads selected data stored in the storage unit 16 so as to be developed in the second application, it is preferable for the control unit 17 to display a selected image, which is based on the selected data, on the display unit 11. It is preferable for the control unit 17 to display an image that is based on peripheral data stored in the storage unit 16, in an area different from the area of displaying the selected image.

Figure 5A:
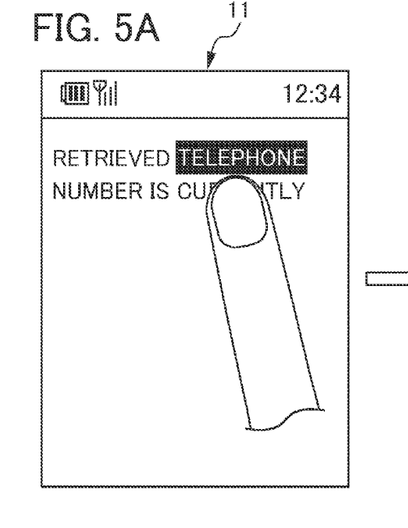
FIG. 5 is a transition diagram showing screens displayed on a display unit.
Figure 5B:
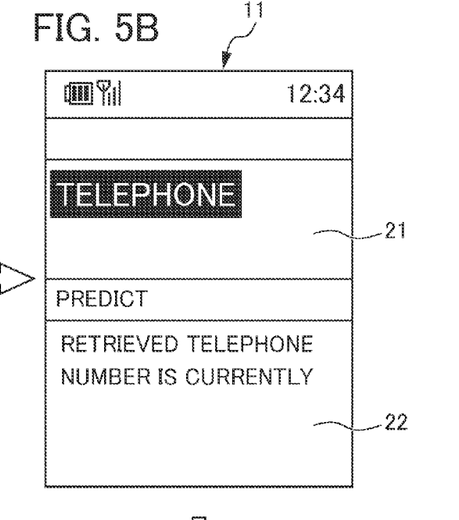
Figure 5C:
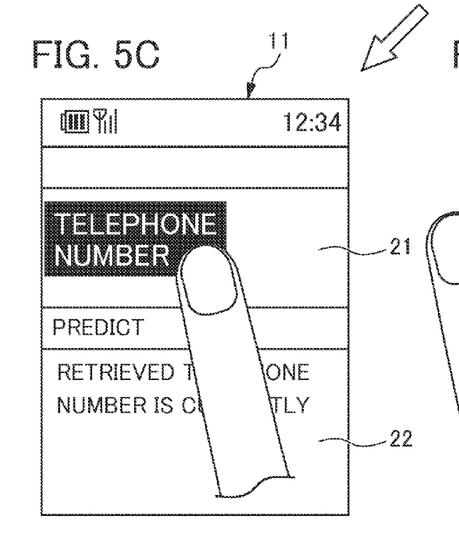
Figure 5D:
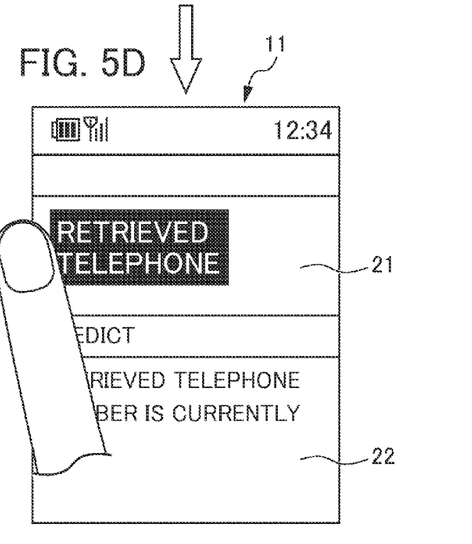

In other words, in a case in which the control unit 17 reads selected data stored in the storage unit 16 so as to be developed in the second application, the control unit 17 displays a selected image display area 21 and a peripheral image display area 22 on the display unit 11 (see FIG. 5B). The control unit 17 disposes and displays a selected image, which is based on the selected data, in the selected image display area 21 on the display unit 11. The control unit 17 disposes and displays peripheral images, which are based on the peripheral data, in the peripheral image display area 22 on the display unit 11.

As a result, since the cellular telephone device 1 displays the selected image and the peripheral images in parallel on the display unit 11, the selected image and the peripheral images can be displayed in a user-friendly manner.

In a case in which an operation for the area on the left side of the selected image displayed on the display unit 11 is performed as a predetermined operation for the selected image by the operation unit 12, it is preferable for the control unit 17 to perform control as follows. First of all, from among the peripheral data stored in the storage unit 16, the control unit 17 sets data, which is positioned on the left side of the selected image, as corresponding data. Subsequently, the control unit 17 adds an image, which is based on the corresponding data, on the left side of the selected image, and displays a resultant image on the display unit 11.

A specific example is described. This specific example employs a state where the selected image "telephone" is displayed on the display unit 11, and the peripheral data corresponding to the peripheral image "retrieved telephone number is currently" is stored in the storage unit 16. In a case in which a left side area of the image "telephone" is touched by a finger as a predetermined operation in this state, the control unit 17 adds an image "retrieved" on the left side of the image "telephone". The control unit 17 displays an image "retrieved telephone" on the display unit 11.

As a result, the cellular telephone device 1 can add an image, which corresponds to a predetermined operation, to the selected image, and display a resultant image on the display unit 11.

In a case in which an operation for the area on the left side of the selected image displayed on the display unit 11 is performed as a predetermined operation for the selected image by the operation unit 12, and the operation for the area on the left side of the selected image is an operation moving from the left side of the selected image toward a left direction, it is preferable for the control unit 17 to perform control as follows. First of all, from among the peripheral data stored in the storage unit 16, the control unit 17 sets data, which is positioned on the left side of the selected image, as corresponding data. Subsequently, the control unit 17 adds an image, which is based on the corresponding data, on the left side of the selected image, and displays a resultant image on the display unit 11.

A specific example is described. This example employs a state where the selected image "telephone" ("DENWA" in Japanese) is displayed on the display unit 11, and the peripheral data corresponding to the peripheral image "retrieved telephone number is currently" is stored in the storage unit 16. In a case in which the left side area of the image "telephone" (the left side of the Japanese image "DEN") is touched by a finger moving toward the left direction as a predetermined operation in this state, the control unit 17 adds the image "retrieved" on the left side of the image "telephone", and displays the image "retrieved telephone" on the display unit 11.

As a result, the cellular telephone device 1 can display an image corresponding to a predetermined operation on the display unit 11.

In a case in which an operation for the area on the left side of the selected image displayed on the display unit 11 is performed as a predetermined operation for the selected image by the operation unit 12, and the operation for the area on the left side of the selected image is an operation moving from the left side of the selected image toward a right direction, it is preferable for the control unit 17 to delete, from the display unit 11, an image corresponding to the area on the left side of the selected image displayed on the display unit 11.

A specific example is described. This example employs a state where the selected image "telephone" ("DENWA" in Japanese) is displayed on the display unit 11, and the peripheral data corresponding to the peripheral image "retrieved telephone number is currently" is stored in the storage unit 16. In a case in which the left side area of the image "telephone" (the left side of the Japanese image "DENWA") is touched by a finger moving toward the right direction as a predetermined operation in this state, the control unit 17 deletes the left side of the image "telephone" (the Japanese image "DEN") from the display unit 11. In other words, the control unit 17 displays a Japanese image "WA" on the display unit 11.

As a result, the cellular telephone device 1 can display an image corresponding to a predetermined operation on the display unit 11.

In a case in which an operation for the area on the right side of the selected image displayed on the display unit 11 is performed as a predetermined operation for the selected image by the operation unit 12, it is preferable for the control unit 17 to set, from among the peripheral data stored in the storage unit 16, data that is positioned on the right side of the selected image as corresponding data, add an image, which is based on the corresponding data, on the right side of the selected image, and display a resultant image on the display unit 11.

A specific example is described. This specific example employs a state where the selected image "telephone" is displayed on the display unit 11, and the peripheral data corresponding to the peripheral image "retrieved telephone number is currently" is stored in the storage unit 16. In a case in which a right side area of the image "telephone" is touched by a finger as a predetermined operation in this state, the control unit 17 adds the image "number is currently" on the right side of the image "telephone". Subsequently, the control unit 17 displays the image "telephone number is currently" on the display unit 11.

As a result, the cellular telephone device 1 can add an image, which corresponds to a predetermined operation, to the selected image, and display a resultant image on the display unit 11.

In a case in which an operation for the area on the right side of the selected image displayed on the display unit 11 is performed as a predetermined operation for the selected image by the operation unit 12, and the operation for the area on the right side of the selected image is an operation moving from the right side of the selected image toward the right direction, it is preferable for the control unit 17 to perform control as follows. First of all, from among the peripheral data stored in the storage unit 16, the control unit 17 sets data, which is positioned on the right side of the selected image, as corresponding data. Subsequently, the control unit 17 adds an image, which is based on the corresponding data, on the right side of the selected image, and displays a resultant image on the display unit 11.

A specific example is described. This specific example employs a state where the selected image "telephone" ("DENWA" in Japanese) is displayed on the display unit 11, and the peripheral data corresponding to the peripheral image "retrieved telephone number is currently" is stored in the storage unit 16. In a case in which the right side area of the image "telephone" (the right side of the Japanese image "WA") is touched by a finger moving toward the right direction as a predetermined operation in this state, the control unit 17 adds an image "number is currently" on the right side of the image "telephone". Subsequently, the control unit 17 displays the image "telephone number is currently" on the display unit 11.

As a result, the cellular telephone device 1 can display an image corresponding to a predetermined operation on the display unit 11.

On the other hand, in a case in which an operation for the area on the right side of the selected image displayed on the display unit 11 is performed as a predetermined operation for the selected image by the operation unit 12, and the operation for the area on the right side of the selected image is an operation moving from the right side of the selected image toward the left direction, it is preferable for the control unit 17 to perform control as follows. The control unit 17 deletes, from the display unit 11, an image corresponding to the area on the right side of selected image displayed on the display unit 11.

A specific example is described. This specific example employs a state where the selected image "telephone" ("DENWA" in Japanese) is displayed on the display unit 11, and the peripheral data corresponding to the peripheral image "retrieved telephone number is currently" is stored in the storage unit 16. In a case in which the right side area of the image "telephone" (the right side of the Japanese image "DENWA") is touched by a finger moving toward the left direction as a predetermined operation in this state, the control unit 17 deletes the right side (the Japanese image "WA") of the image "telephone" from the display unit 11. In other words, the control unit 17 displays the Japanese image "DEN" on the display unit 11.

As a result, the cellular telephone device 1 can display an image corresponding to a predetermined operation on the display unit 11.

Next, operations of the cellular telephone device 1 are described. It should be noted that a program executed in the cellular telephone device 1 is a program for operating the components of the cellular telephone device 1. Accordingly, an embodiment of the program of the present invention is also described in addition to the descriptions of the operations of the cellular telephone device 1.

Figure 3:
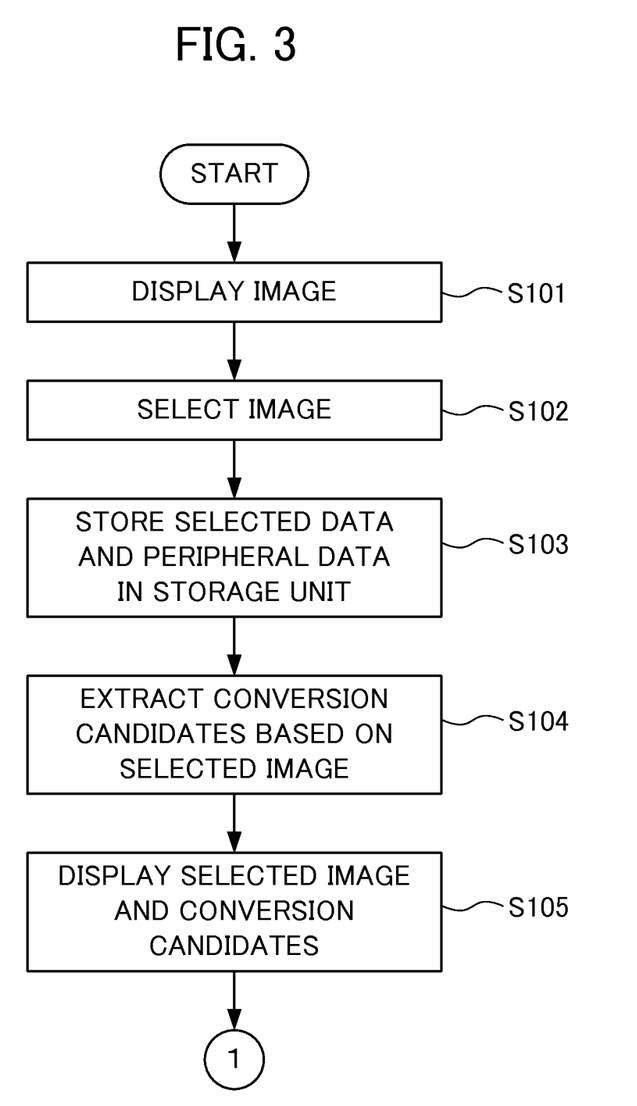
FIG. 3 is a first flow chart for illustrating operations of the cellular telephone device 1.
Figure 4:
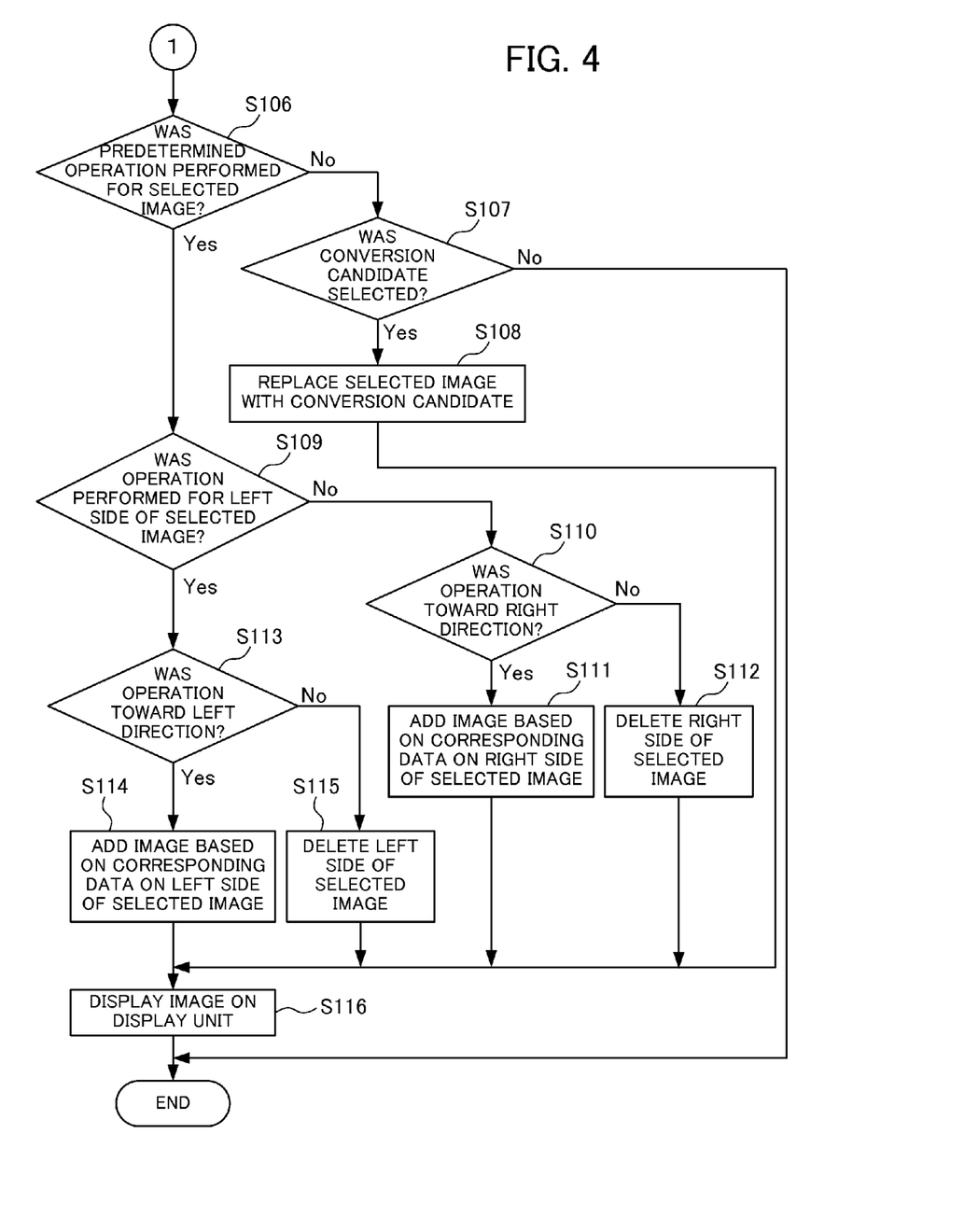
FIG. 4 is a second flow chart for illustrating operations of the cellular telephone device 1.

FIG. 3 is a first flow chart for illustrating operations of the cellular telephone device 1. FIG. 4 is a second flow chart for illustrating operations of the cellular telephone device 1. FIG. 5 is a transition diagram showing screens displayed on the display unit 11.

First of all, in Step S101 shown in the FIG. 3, the control unit 17 displays an image on the display unit 11, based on processing by the first application. Here, descriptions are provided for a case in which the image "retrieved telephone number is currently . . . " is displayed on the display unit 11.

In Step S102, at least a part of the image displayed on the display unit 11 is selected by the operation unit 12. Here, as a result of a finger of the user touching the area corresponding to the image "telephone" displayed on the display unit 11, the image "telephone" is selected as a selected image by the operation unit 12 (see FIG. 5A).

In Step S103, the storage unit 16 stores selected data corresponding to the selected image selected by the processing in Step S102, and peripheral data corresponding to images around the selected image. Here, the peripheral data corresponding to the peripheral image "retrieved telephone number is currently" is stored in the storage unit 16.

In Step S104, the control unit 17 extracts conversion candidates, based on the selected image. The conversion candidates are, for example, peripheral images (characters) that are based on the peripheral data, and other images (characters). Here, in a case in which the conversion candidates are the other images (characters) as described above, the control unit 17 extracts appropriate images, based on the selected image and the peripheral images. For example, in a case in which a character string that is registered with a dictionary is present as a result of including the selected image in the peripheral images, the control unit 17 extracts the character string as a conversion candidate. As a more specific example, in a case in which a word/phrase including the selected image "telephone" is present in the peripheral image "retrieved telephone number is currently", the control unit 17 extracts the word/phrase (for example, "telephone number") as a conversion candidate.

In Step S105, based on the processing by the second application, the display unit 11 displays the selected image selected by the processing in Step S102, and a conversion candidate extracted by the processing in Step S104. In this case, the display unit 11 disposes and displays the selected image in the selected image display area 21. Moreover, the display unit 11 disposes and displays the conversion candidate in the peripheral image display area 22. Here, the selected image "telephone" is disposed in the selected image display area 21 (see FIG. 5B). In addition, the conversion candidate (peripheral image) "retrieved telephone number is currently" is disposed in the peripheral image display area 22 (see FIG. 5B).

After Step S105, the processing advances to Step S106 shown in the FIG. 4.

In Step S106 shown in the FIG. 4, the control unit 17 determines whether a predetermined operation for the selected image was performed as a result of the operation unit 12 being operated. In a case in which a predetermined operation was not performed (No), the processing advances to Step S107. In a case in which a predetermined operation was performed (Yes), the processing advances to Step S107.

In Step S107, the control unit 17 determines whether a conversion candidate displayed in the peripheral image display area 22 of the display unit 11 was selected as a result of the operation unit 12 being operated. In a case in which a conversion candidate was not selected (No), the processing is terminated. In a case in which a conversion candidate was selected (Yes), the processing advances to Step S108.

In Step S108, the display unit 11 replaces the selected image displayed in the selected image display area 21 with the conversion candidate (image) that has been selected. After Step S108, the processing advances to Step S116.

In a case in which the determination in Step S106 was "Yes", in Step S109, the control unit 17 determines whether the predetermined operation was an operation for the left side area of the selected image displayed on the display unit 11. In a case in which the predetermined operation was not an operation for the left side area (No), the processing advances to Step S110. In a case in which the predetermined operation was an operation for the left side area (Yes), the processing advances to Step S113.

In Step S110, the control unit 17 determines whether the predetermined operation was an operation by a finger or the like of the user to touch the touch panel 10 so as to move from the right side area of the selected image toward the right direction. In a case in which the predetermined operation was an operation moving toward the right direction (Yes), the processing advances to Step S111. In a case in which the predetermined operation was not an operation moving toward the right direction (No), the processing advances to Step S112.

In Step S111, the control unit 17 adds an image, which is based on corresponding data selected by the predetermined operation, on the right side of the selected image. After Step S111, the processing advances to Step S116.

In Step S112, the control unit 17 deletes an image corresponding to the right side area of the selected image. After Step S112, the processing advances to Step S116.

In a case in which the determination in Step S109 was "Yes", in Step S113, the control unit 17 determines whether the predetermined operation was an operation by a finger or the like of the user to touch the touch panel 10 so as to move from the left side area of the selected image toward the left direction. In a case in which the predetermined operation was an operation moving toward the left direction (Yes), the processing advances to Step S114. In a case in which the predetermined operation was not an operation moving toward the left direction (No), the processing advances to Step S115.

In Step S114, the control unit 17 adds an image, which is based on corresponding data selected by the predetermined operation, on the left side of the selected image. After Step S114, the processing advances to Step S116.

In Step S115, the control unit 17 deletes an image corresponding to the left side area of the selected image. After Step S115, the processing advances to Step S116.

In Step S116, the display unit 11 displays a resultant image. Here, in a case in which the processing in Step S111 was performed, the display unit 11 displays an image ("telephone number" here), in which the image that is based on the corresponding data ("number" here) is added on the right side of the selected image ("telephone" here) (see FIG. 5C). In a case in which the processing in Step S114 was performed, the display unit 11 displays an image ("retrieved telephone" here), in which the image that is based on the corresponding data ("retrieved" here) is added on the left side of the selected image ("telephone" here) (see FIG. 5D).

As a result, even in a case in which an image (a selected image) selected in the first application is developed in the second application, the cellular telephone device 1 can replace the selected image with another image.

It should be noted that the aforementioned embodiment has been described for a case in which a character string and the like are displayed as images on the display unit 11. However, the images displayed on the display unit 11 are not limited to character strings. In other words, such an image may be a static image such as a photograph and a map, or an animated image, or an image or the like, based on processing by an application that reproduces and edits music or the like.

The operation unit that configures the present invention is not limited to the aforementioned mode that configures the touch panel 10, and may be a mode that is configured with hard keys. In the mode that is configured with hard keys, for example, an image is selected by moving a cursor by way of direction designating keys and the like.

The cellular telephone device is not limited to a straight type. For example, the cellular telephone device may be of: a folder type in which two bodies are connected via a hinge; a slider type in which one of the bodies slides to one direction in a state in which the bodies are mutually superimposed; or a rotating (turning) type in which one of the bodies is rotated around an axis line along the direction of superimposing the bodies.

The aforementioned embodiment has been described for a case in which the present invention is applied to the cellular telephone device 1. However, the present invention is not limited the aforementioned embodiment, and may also be applied to an electronic device such as a PHS (Personal Handyphone System), a PDA (Personal Digital Assistant), a portable gaming device, or a portable navigation device.

What is claimed is:

1. An electronic device, comprising:
    a display unit that displays a first image that is based on data;
    an operation unit that can select at least a part of the first image displayed on the display unit as a selected image;
    a storage unit, wherein, in a case in which the first image is displayed on the display unit as a result of processing by a first application, and the selected image is selected by the operation unit, the storage unit stores selected data as data of the selected image, and peripheral data as data of peripheral images existing around the selected image from among the first image; and
    a control unit,
    wherein, in a case in which a second application different from the first application is activated after the selected data and the peripheral data are stored in the storage unit, the control unit reads the selected data stored in the storage unit so as to be developed in the second application, and displays a the selected image, which is based on the selected data, on the display unit,
    wherein, in a case in which a predetermined operation is performed by the operation unit for the selected image developed in the second application and displayed on the display unit, the control unit reads the peripheral data stored in the storage unit, and displays at least a part of the peripheral images, around the selected image displayed on the display unit,
    wherein data of at least a part of the peripheral images is corresponding data that is specified from the peripheral data in accordance with an operated variable of the predetermined operation, and
    wherein the predetermined operation is an operation for an area on a right side of the selected image, or an operation for an area on a left side of the selected image.

2. The electronic device according to claim 1, wherein, in a case in which the control unit displays at least a part of the peripheral images, around the selected image displayed on the display unit, the control unit deletes the peripheral data from the storage unit.

3. The electronic device according to claim 1, wherein the control unit deletes the peripheral data from the storage unit in a case in which the second application is terminated.

4. The electronic device according to claim 1, wherein, in a case in which the control unit reads the selected data stored in the storage unit so as to be developed in the second application, the control unit arranges the selected image and the peripheral images in different display areas, and concurrently displays the selected image and the peripheral images on the display unit.

5. The electronic device according to claim 1, wherein, in a case in which an operation for an area on a left side of the selected image displayed on the display unit is performed as the predetermined operation, the control unit specifies an image arranged on the left side of the selected image from among the peripheral images, and displays the specified image on the left side of the selected image displayed on the display unit.

6. The electronic device according to claim 5,
    wherein, in a case in which an operation for an area on the left side of the selected image displayed on the display unit is performed as the predetermined operation,
    when the operation for the area on the left side of the selected image is an operation moving toward a left direction from the selected image, the control unit specifies an image arranged on the left side of the selected image from among the peripheral images, displays the specified image on the left side of the selected image displayed on the display unit, sets, from among the peripheral data stored in the storage unit, data that is arranged on the left side of the selected image as the corresponding data, adds an image, which is based on the corresponding data, on the left side of the selected image, and displays a resultant image on the display unit, and
    when the operation for the area on the left side of the selected image is an operation moving toward a right direction from the selected image, the control unit deletes, from the display unit, an image arranged on the left side of the selected image displayed on the display unit.

7. The electronic device according to claim 1, wherein, in a case in which an operation for an area on a right side of the selected image displayed on the display unit is performed as the predetermined operation, the control unit specifies an image arranged on the right side of the selected image from among the peripheral images, and displays the specified image on the right side of the selected image displayed on the display unit.

8. The electronic device according to claim 7,
    wherein, in a case in which the operation for the area on the right side of the selected image displayed on the display unit is performed as the predetermined operation,
    when the operation for the area on the right side of the selected image is an operation moving toward a right direction from the selected image, the control unit specifies an image arranged on the right side of the selected image from among the peripheral images, and displays the specified image on the right side of the selected image displayed on the display unit, and
    when the operation for the area on the right side of the selected image is an operation moving toward a left direction from the selected image, the control unit deletes, from the display unit, an image arranged on the right side of the selected image displayed on the display unit.

9. A display method for an electronic device that includes a display unit, an operation unit and a storage unit, the method comprising the steps of:
    selecting at least a part of a first image, which is based on data displayed on the display unit as a result of processing by a first application, as a selected image by the operation unit;

storing selected data as data of the selected image selected by the operation unit, and peripheral data as data of peripheral images existing around the selected image from among the first image, in the storage unit;

reading the selected data stored in the storage unit so as to be developed in a second application different from the first application, and displaying the selected image, which is based on the selected data, on the display unit; and in a case in which an operation is performed by the operation unit for an area on a right or left side of the selected image developed in the second application and displayed on the display unit, reading the peripheral data from the storage unit, and displaying an image of at least a part of the peripheral images, around the selected image displayed on the display unit.

10. A non-transitory recording medium for storing a program executed by an electronic device that includes a display unit, an operation unit and a storage unit, the program executing the steps of:

selecting at least a part of a first image, which is based on data displayed on the display unit as a result of processing by a first application, as a selected image by the operation unit;

storing selected data as data of the selected image selected by the operation unit, and peripheral data as data of peripheral images existing around the selected image from among the first image, in the storage unit;

reading the selected data stored in the storage unit so as to be developed in a second application different from the first application, and displaying the selected image, which is based on the selected data, on the display unit; and in a case in which an operation is performed by the operation unit for an area on a right or left side of the selected image developed in the second application and displayed on the display unit, reading the peripheral data from the storage unit, and displaying an image of at least a part of the peripheral images, around the selected image displayed on the display unit.

\* \* \* \* \*